(12) United States Patent (10) Patent No.: US 9,264,617 B2
Misawa (45) Date of Patent: Feb. 16, 2016

(54) CAMERA AND METHOD OF CONTROLLING OPERATION OF SAME

(71) Applicant: FUJIFILM CORPORATION, Tokyo (JP)

(72) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/604,422

(22) Filed: Jan. 23, 2015

(65) Prior Publication Data

US 2015/0130955 A1 May 14, 2015

Related U.S. Application Data

(63) Continuation of application No. PCT/JP2013/065369, filed on Jun. 3, 2013.

(30) Foreign Application Priority Data

Jul. 24, 2012 (JP) .................................. 2012-163890

(51) Int. Cl.
*H04N 5/232* (2006.01)
*G03B 13/06* (2006.01)
(Continued)

(52) U.S. Cl.
CPC ............ *H04N 5/23264* (2013.01); *G03B 13/06* (2013.01); *G03B 13/08* (2013.01);
(Continued)

(58) Field of Classification Search
CPC .......... H04N 5/23264; H04N 5/23212; H04N 5/23254; H04N 5/23293; H04N 2101/00; G03B 13/34; G03B 13/08; G03B 17/20; G03B 13/18; G03B 13/06; G03B 2217/185
See application file for complete search history.

(56) References Cited

U.S. PATENT DOCUMENTS 6,556,791 B1 * 4/2003 Oinen .................... G02B 23/14
348/64
8,670,061 B2 * 3/2014 Sakurabu ........... H04N 5/23293
348/333.01
(Continued)

FOREIGN PATENT DOCUMENTS

JP     2000-258834 A     9/2000
JP     2005-198035 A     7/2005
(Continued)

OTHER PUBLICATIONS

International Preliminary Report on Patentability issued in PCT/JP2013/065369, dated Nov. 11, 2014.
(Continued)

*Primary Examiner* — Aung S Moe
(74) *Attorney, Agent, or Firm* — Birch, Stewart, Kolash & Birch, LLP

(57) ABSTRACT

An optical image of the subject is obtained by the finder unit. An image of the subject obtained by imaging is displayed on the display screen of an optical viewfinder. Looking through the finder unit, the user can see an image obtained by superimposing the image of the subject, which is displayed on the display screen of the electronic viewfinder, upon the optical image of the subject. The two images of the subject coincide when the subject is in focus and do not coincide when the subject is not in focus. The user can bring the subject into focus while looking through the finder unit to ascertain the degree of offset between the images of the subject. In cases such as excessive camera shake, the subject appears blurry. In response, the display of the image of the subject upon the display screen of the electronic viewfinder is halted.

11 Claims, 12 Drawing Sheets

(51) Int. Cl.
  *G03B 13/18* (2006.01)
  *G03B 17/20* (2006.01)
  *G03B 13/08* (2006.01)
  *G03B 13/34* (2006.01)
  *H04N 101/00* (2006.01)

(52) U.S. Cl.
  CPC ............... *G03B 13/18* (2013.01); *G03B 13/34* (2013.01); *G03B 17/20* (2013.01); *H04N 5/23212* (2013.01); *H04N 5/23254* (2013.01); *H04N 5/23293* (2013.01); *G03B 2217/185* (2013.01); *H04N 2101/00* (2013.01)

(56) References Cited

U.S. PATENT DOCUMENTS

| | | | | |
|---|---|---|---|---|
| 2011/0157404 | A1* | 6/2011 | Shiohara | H04N 5/23212 348/222.1 |
| 2013/0188086 | A1* | 7/2013 | Fujiki | G03B 3/10 348/333.09 |
| 2014/0211069 | A1* | 7/2014 | Koguchi | G03B 13/12 348/333.09 |
| 2014/0333819 | A1* | 11/2014 | Aoki | G03B 13/06 348/333.09 |
| 2014/0368719 | A1* | 12/2014 | Kaneko | H04N 5/23216 348/333.02 |
| 2014/0375864 | A1* | 12/2014 | Miyagishima | G03B 13/06 348/333.09 |
| 2015/0070539 | A1* | 3/2015 | Kawai | G02B 7/34 348/280 |
| 2015/0103210 | A1* | 4/2015 | Inoue | G02B 7/346 348/239 |
| 2015/0103217 | A1* | 4/2015 | Fujita | G03B 13/06 348/294 |
| 2015/0109467 | A1* | 4/2015 | Fujita | G03B 13/06 348/208.4 |
| 2015/0109510 | A1* | 4/2015 | Fujita | G03B 17/02 348/333.02 |
| 2015/0116560 | A1* | 4/2015 | Misawa | G03B 13/06 348/294 |
| 2015/0124131 | A1* | 5/2015 | Misawa | H04N 5/23293 348/294 |
| 2015/0130955 | A1* | 5/2015 | Misawa | G03B 13/18 348/208.5 |
| 2015/0130982 | A1* | 5/2015 | Misawa | G03B 13/06 348/333.08 |

FOREIGN PATENT DOCUMENTS

| | | |
|---|---|---|
| JP | 2007-163724 A | 6/2007 |
| JP | 2007-298672 A | 11/2007 |
| JP | 2009-177345 A | 8/2009 |
| JP | 2011-135490 A | 7/2011 |
| JP | 2012-65294 A | 3/2012 |
| JP | 2012-85261 A | 4/2012 |
| WO | WO 2012/035877 A1 | 3/2012 |

OTHER PUBLICATIONS

International Search Report issued in PCT/JP2013/065369, dated Sep. 3, 2013.
Written Opinion of the International Searching Authority issued in PCT/JP2013/065369, dated Sep. 3, 2013.

* cited by examiner

CAMERA AND METHOD OF CONTROLLING OPERATION OF SAME

CROSS-REFERENCE TO RELATED APPLICATIONS

This application is a Continuation of PCT International Application No. PCT JP2013/065369 filed on Jun. 3, 2013, which claims priority under 35 U.S.C. §119(a) to Japanese Patent Application No. 2012-163890 filed Jul. 24, 2012. Each of the above application(s) is hereby expressly incorporated by reference, in its entirety, into the present application.

BACKGROUND OF THE INVENTION

1. Field of the Invention

This invention relates to a camera and to a method of controlling the operation thereof.

2. Description of the Related Art

There is a digital camera equipped with a device having both optical and electronic finders (Patent Document 1). The fine optical image of a subject can be seen by using the optical finder, and the image of a subject identical with the captured image of the subject can be seen by using the electronic finder.

Further, there is a camera in which a partial image clipped from a subordinate image obtained from the image sensor of a subordinate imaging unit is superimposed upon a main image obtained from the image sensor of a main imaging unit (Patent Document 2), as well as a camera in which the operation of a conventional image coincidence optical rangefinder is performed by superimposing images from two image sensing devices (Patent Document 3). Furthermore, as examples of cameras concerned with camera shake, there is a camera which, if the amount of camera shake is great, will not enlarge a face area but which, if the amount of camera shake is small, will superimpose an enlarged image of the face area upon the entire image (Patent Document 4), and a camera adapted so as to darken the image of a subject by a polarization filter or the like so that the user will not be aware of camera shake (Patent Document 5).

Patent Document 1: Japanese Patent Application Laid-Open No. 2012-65294
Patent Document 2: Japanese Patent Application Laid-Open No. 2011-135490
Patent Document 3: Japanese Patent Application Laid-Open No. 2007-163724
Patent Document 4: Japanese Patent Application Laid-Open No. 2009-177345
Patent Document 5: Japanese Patent Application Laid-Open No. 2000-258834

Cameras heretofore referred to as high-performance cameras are equipped with a double-image coincidence rangefinder which, when the user performs focusing while looking at the finder device, is such that the image of the subject becomes a pair of offset images if the image of the subject is out of focus, although such offset vanishes when the image of the subject is brought into focus. Hence there is a need to arrange it so that the double-image coincidence system can be applied also to a camera having both the optical and electronic finders mentioned above. However, none of Patent Documents 1 to 3 give any consideration whatsoever to the application of the double-image coincidence system to such an optical/electronic viewfinder. Furthermore, in a case where such double-image coincidence system is considered, not only does the user experience a sense of discomfort when a subject or the camera is in motion but also a problem arises in that there are instances where the user cannot confirm accurate focusing at such time.

SUMMARY OF THE INVENTION

An object of the present invention is to eliminate a sense of discomfort when a subject or the camera is in motion in a case where a double-image coincidence system is applied to a finder having both optical and electronic functions.

According to the present invention, there is provided a camera comprising: a lens barrel, which is provided on its periphery with a focusing ring being freely rotatable and incorporates a focusing lens, for adjusting the position of the focusing lens in accordance with rotation of the focusing ring; a solid-state electronic image sensing device for capturing the image of a subject, which is formed by the focusing lens, and outputting image data representing the image of the subject; a display unit for displaying on a display screen an image within a desired AF target area in the image of the subject represented by the image data that has been output from the solid-state electronic image sensing device; a finder unit formed on the front of the camera and having an objective window facing a subject and an eyepiece window for looking at an optical image of the subject seen through the objective window; a deflecting unit, which is provided between the objective window and the eyepiece window, for introducing the image within the AF target area, which is being displayed on the display screen of the display unit, to the eyepiece window; a first display control device (first display control means) for controlling the display unit so as to display the image within the AF target area on the display screen in such a manner that, if the image within the AF target area is out of focus, the optical image of the subject seen through the objective window and the image within the AF target area will be offset from each other, and so as to display the image within the AF target area on the display screen in such a manner that, if the image within the AF target area is in focus, the optical image of the subject seen through the objective window and the image within the AF target area will coincide; a motion determination device (motion determination means) for determining whether the camera or the subject is moving an amount equal to or greater than a threshold value; and a second display control device (second display control means), responsive to a determination by the motion determination device that the camera or the subject is moving an amount equal to or greater than a threshold value, for controlling the display unit so as to remove the image displayed on the display screen of the display unit owing to control by the first display control device.

The present invention also provides an operation control method suited to the above-described camera. Specifically, the present invention provides a method of controlling operation of a camera having a lens barrel, which is provided on its periphery with a focusing ring being freely rotatable and incorporates a focusing lens, for adjusting the position of the focusing lens in accordance with rotation of the focusing ring, and a finder unit formed on the front of the camera and having an objective window facing a subject and an eyepiece window for looking at an optical image of the subject seen through the objective window, the method comprising steps of: a solid-state electronic image sensing device capturing the image of a subject, which is formed by the focusing lens, and outputting image data representing the image of the subject; a display unit displaying on a display screen an image within a desired AF target area in the image of the subject represented by the image data that has been output from the solid-state electronic image sensing device; a deflecting unit, which is provided between the objective window and the eyepiece window, introducing the image within the AF target area, which is being displayed on the display screen of the display unit, to the eyepiece window; a first display control device controlling the display unit so as to display the image within the AF target area on the display screen in such a manner that, if the image within the AF target area is out of focus, the optical image of the subject seen through the objective window and the image within the AF target area will be offset from each other, and so as to display the image within the AF target area on the display screen in such a manner that, if the image within the AF target area is in focus, the optical image of the subject seen through the objective window and the image within the AF target area will coincide; a motion determination device determining whether the camera or the subject is moving an amount equal to or greater than a threshold value; and in response to a determination by the motion determination device that the camera or the subject is moving an amount equal to or greater than a threshold value, a second display control device controlling the display unit so as to remove the image displayed on the display screen of the display unit owing to control by the first display control device.

In accordance with the present invention, a finder unit is provided. When the user looks through the eyepiece window of the finder unit, the user can see the image of a subject formed through the objective window of the finder unit. Further, the subject is imaged by a solid-state electronic image sensing device. The image within an AF target area is displayed on the display screen of a display unit the image of the subject obtained by imaging. The image within the AF target area displayed on the display screen is introduced to the eyepiece window of the finder unit by a deflecting unit and this image is superimposed upon the optical image of the subject. If the image within the AF target area is not in focus, the image within the AF target area is displayed on the display screen of the display unit in such a manner that the optical image of the subject and the image within the AF target area are offset from each other. If the image within the AF target area is in focus, then the image within the AF target area is displayed on the display screen of the display unit in such a manner that the optical image of the subject and the image within the AF target area will not be offset from each other but will coincide. Thus a so-called double-image coincidence finder unit can be realized.

In particular, in accordance with the present invention, if movement of the camera or subject is equal to or greater than a threshold value, the image is eliminated without being displayed. If the camera or subject is in motion, the user will not only sense discomfort but will also experience difficulty in focusing. In this case, therefore, focusing that utilizes the so-called double-image coincidence system is halted.

The first display control device may include a rotation-amount detection device for detecting amount of rotation of the focusing ring. In this case, the display control device would control the display unit, based upon amount of rotation detected by the rotation-amount detection unit, so as to display the image within the AF target area on the display screen in such a manner that, if the image within the AF target area is out of focus, the optical image of the subject seen through the objective window and the image within the AF target area will be offset from each other in at least the transverse direction, and so as to display the image within the AF target area on the display screen in such a manner that, if the image within the AF target area is in focus, the optical image of the subject seen through the objective window and the image within the AF target area will coincide.

The first display control device may control the display unit, based upon amount of rotation detected by the rotation-amount detection unit, so as to display the image within the AF target area on the display screen in such a manner that, if the image within the AF target area is out of focus, the optical image of the subject seen through the objective window and the image within the AF target area will be offset from each other on an axis connecting optical axis of the lens barrel and optical axis of the finder unit, and so as to display the image within the AF target area on the display screen in such a manner that, if the image within the AF target area is in focus, the optical image of the subject seen through the objective window and the image within the AF target area will coincide.

The first display control device may control the display unit so as to cause the image within the AF target area to move along at least the transverse direction in accordance with rotation of the focusing ring, and so as to display the image within the AF target area on the display screen in such a manner that, in a case where in-focus position of the focusing lens coincides with distance to the subject, the optical image of the subject seen through the objective window and the image within the AF target area will coincide. Further, the first display control device may include: a rotation-amount detection device (rotation-amount detection means) for detecting amount of rotation of the focusing ring; and a distance calculation device (distance calculation device) for calculating, based upon the amount of rotation detected by the rotation-amount detection device, at what distance in front of the camera a subject at this distance is in focus; the first display control device causing the optical image of a subject seen through the objective window of the finder unit, where this subject is at the distance calculated by the distance calculation device, to coincide with the image within the AF target area being displayed on the display screen of the display unit owing to imaging of this subject by the solid-state electronic image sensing device.

By way of example, the first display control device displays the image within the AF target area on the display screen upon correcting an offset between the optical image of the subject seen through the objective window and the image within the AF target area, the offset being ascribable to an offset between optical axis of the solid-state electronic image sensing device and optical axis of the finder unit.

The first control display device displays the image within the AF target area on the display screen upon correcting, by a correction quantity that conforms to the distance calculated by the distance calculation device, an offset between the optical image of the subject seen through the objective window and the image within the AF target area, the offset being ascribable to an offset between optical axis of the solid-state electronic image sensing device and optical axis of the finder unit.

The camera may further comprise a first AF target area setting device (first AF target area setting means) for setting at least one among position, size and number of the AF target area(s).

The camera may further comprise a second AF target area setting device (second AF target area setting means) for setting at least one of brightness and density of the image within the AF target area.

The camera may further comprise: a face detection device (face detection means) for detecting the area of a face included in the image of a subject captured by the solid-state electronic image sensing device; and a third AF target area setting device (third AF target area setting means) for setting the area of the face, which has been detected by the face detection device, to the AF target area.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
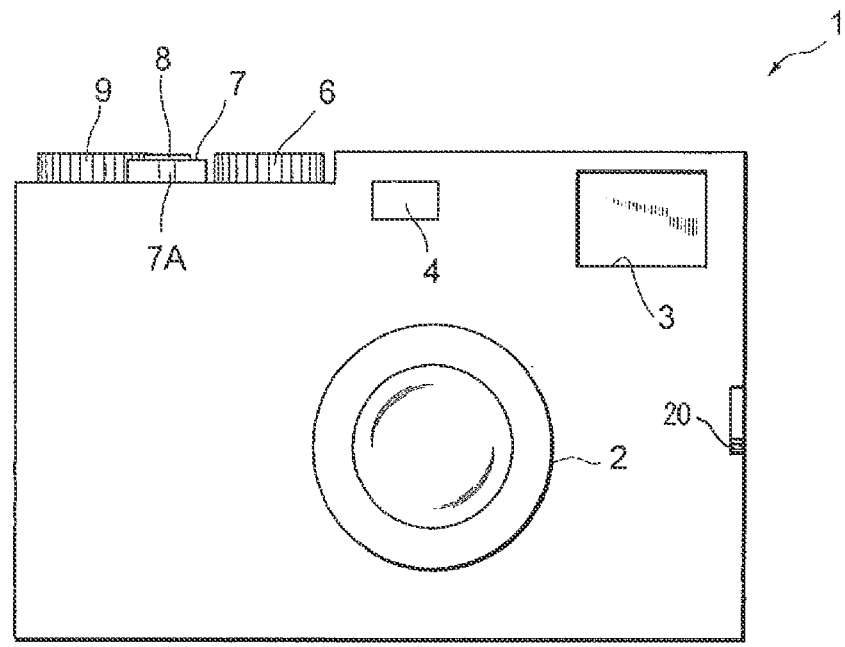
FIG. 1 is a front view of a digital camera.
Figure 2:
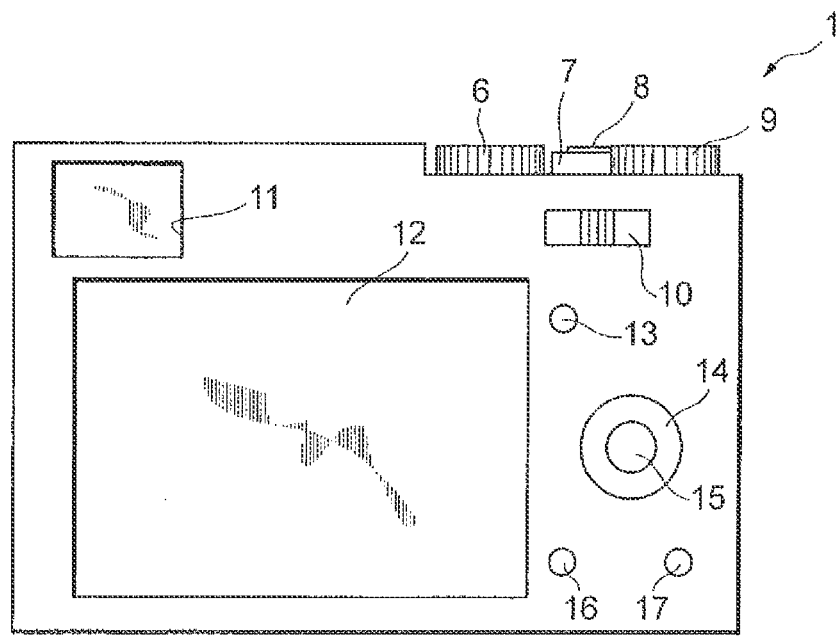
FIG. 2 is a back view of the digital camera.
Figure 3:
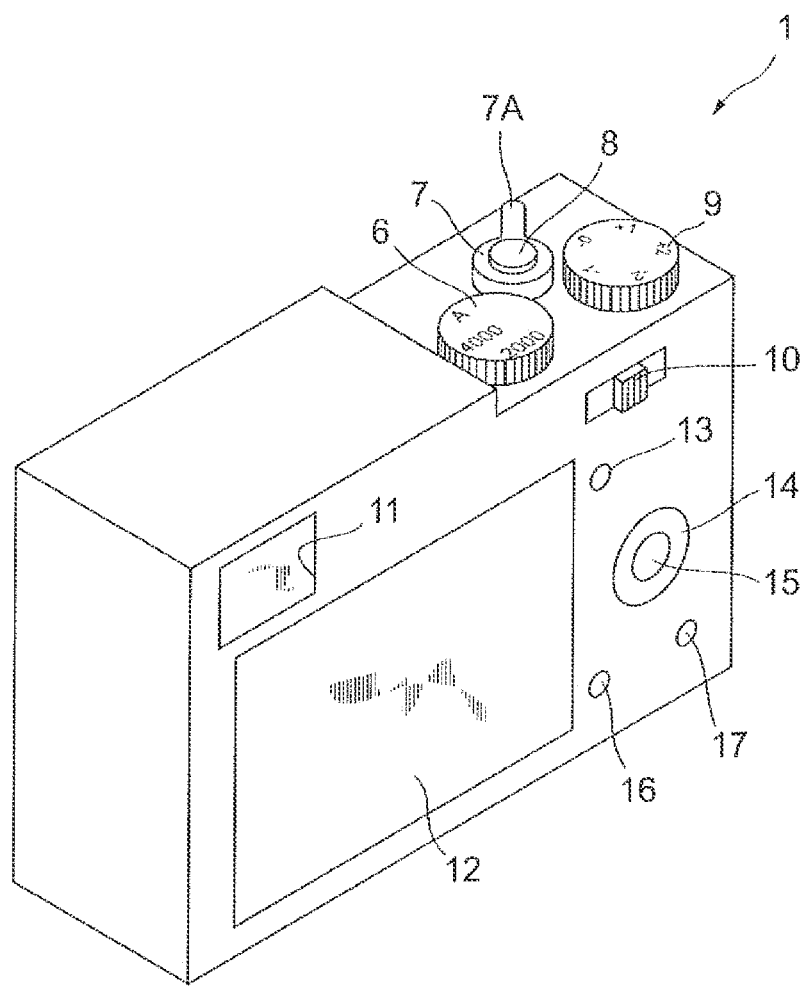
FIG. 3 is a perspective view of the digital camera when viewed from the back.

FIGS. 1 to 3, which illustrate an embodiment of the present invention, show the external appearance of a digital camera 1. FIG. 1 is a front view, FIG. 2 a back view and FIG. 3 a perspective view when viewed from the back.

With reference to FIG. 1, a lens barrel 2 projects forwardly from the approximate center of the front side of the digital camera 1. An optical viewfinder is constructed at the upper right of the digital camera 1 and is formed to include an objective window 3 facing a subject. A flash device 4 is provided on the left side of the objective window 3.

A shutter-speed dial 6, a power lever 7, a shutter-release button 8 and an exposure dial 9 are provided on the top of the digital camera 1 on the left side thereof when viewed from the front. The shutter-speed dial 6 is a circular dial that is free to rotate. By rotating the shutter-speed dial 6, the user can set a desired shutter speed. The power lever 7 can be moved through a prescribed angle rightward and leftward as seen from the front. By moving the power lever 7 through the prescribed angle, the user can turn the power supply of the digital camera 1 on and off. The power lever 7 has the shape of a ring with an interior space when viewed from the top (see FIG. 3), and the shutter-release button 8 is provided within the space. The exposure dial 9 also is a circular dial that is free to rotate. By turning the exposure dial 9, the user can correct the exposure. Further, a focus setting lever 20 is formed on the right edge of the digital camera 1 when viewed from the front.

The focus setting lever 20, which is freely slidable up and down, is capable of setting the camera to double-image coincidence manual focusing (the details of which will be described later) or to autofocus.

With reference to FIGS. 2 and 3, a display screen 12 of a liquid crystal display device is formed substantially over the entirety of the back side of the digital camera 1. An eyepiece window 11 constituting a finder unit is formed on the back side of the digital camera 1 at the upper left thereof. A command lever 10 movable to the left and right is provided on the back side of the digital camera 1 at the upper right thereof. By manipulating the command lever 10, the user can supply the digital camera 1 with a command such as an aperture adjustment command in steps of ⅓ EV when the camera is in the manual exposure mode.

Provided below the command lever 10 are an AF (autofocus)/AE (autoexposure) lock button 13, a command dial 14, a menu/OK button 15, a back button 16 and a RAW button 17, etc.

With reference primarily to FIG. 3, the shutter-speed dial 6, the power lever 7, the shutter-release button 8 and the exposure dial 9 are provided on the top of the digital camera 1 on the right side thereof (the right side when viewed from the back), as mentioned above. The power lever 7 is formed to have a projection 7A projecting toward the front side. The power supply of the digital camera 1 can be turned on and off by grasping the projection 7A and moving it to the right or left.

By bringing an eye close to the eyepiece window 11 of the finder unit and looking at the eyepiece window 11, the user can view a subject through the objective window 3 and the eyepiece window 11 and can decide the camera angle.

Figure 4:
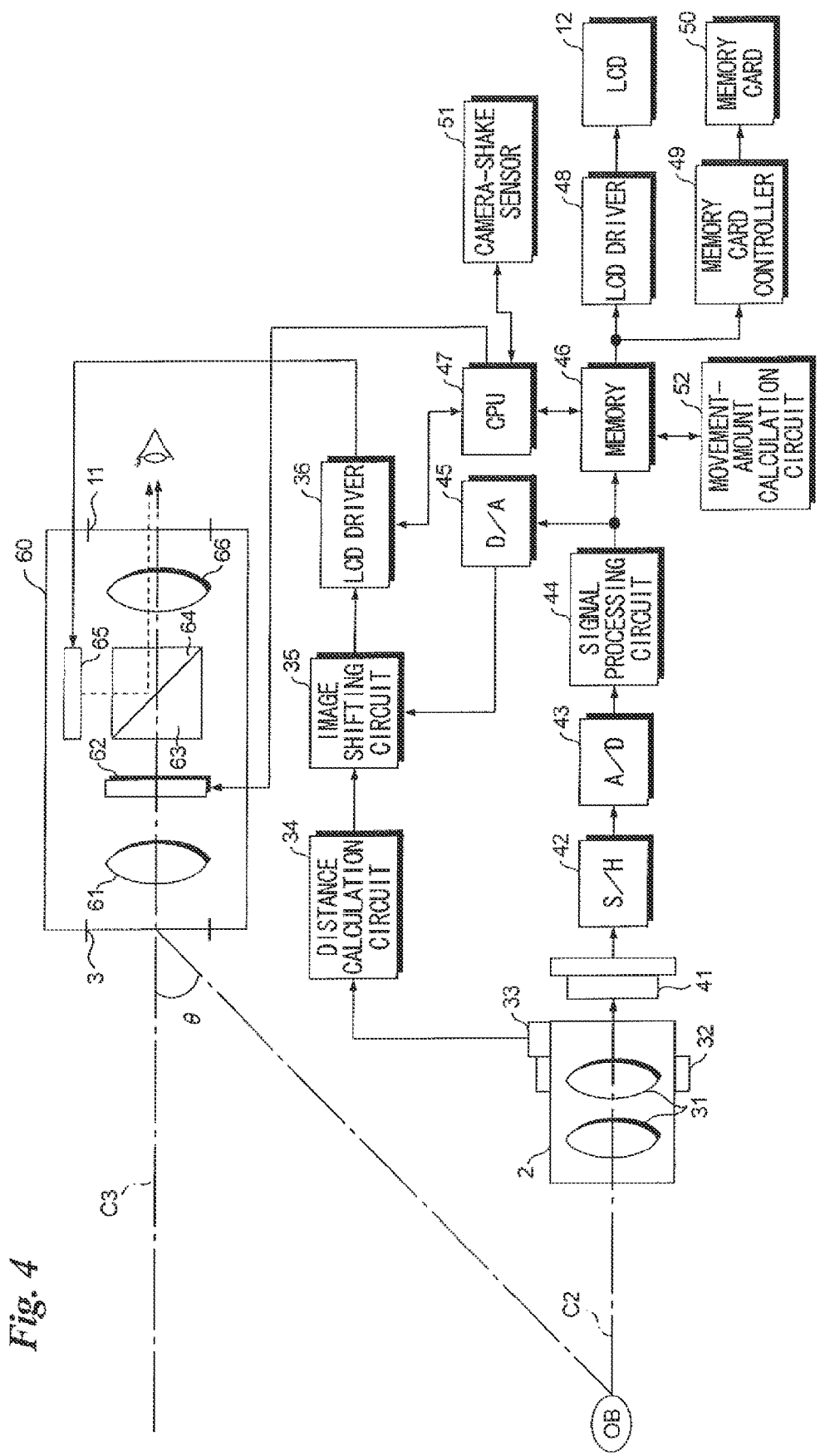
FIG. 4 is a block diagram illustrating the electrical configuration of the digital camera.

FIG. 4 is a block diagram illustrating the electrical configuration of the digital camera 1.

The overall operation of the digital camera is controlled by a CPU 47.

The digital camera 1 includes a solid-state electronic image sensing device 41. A focusing lens group 31 incorporated in the lens barrel 2 is positioned in front of the solid-state electronic image sensing device 41. A freely rotatable focusing ring 32 is provided on the periphery of the lens barrel 2. The focusing lens group 31 is positioned in accordance with user manipulation of the focusing ring 32.

When a subject is imaged by the solid-state electronic image sensing device 41, a video signal representing the image of the subject is output from the solid-state electronic image sensing device 41. The video signal is input to an analog/digital conversion circuit 43 via a sample/hold circuit 42. The video signal is converted to digital image data by the analog/digital conversion circuit 43. A signal processing circuit 44 subjects the digital image data obtained by the conversion to predetermined signal processing such as a white balance adjustment and gamma correction.

The digital image data that has been output from the signal processing circuit 44 is applied to an LCD (Liquid Crystal Display) driver 48 via a memory 46. The liquid crystal display device 12 (the same reference characters are used to denote the display screen) is controlled by the LCD driver 48 and the image of the subject captured by the solid-state electronic image sensing device 41 is displayed on the display screen of the liquid crystal display device 12.

When the shutter-release button 8 is pressed, the image data that has been input to the memory 46, as mentioned above, is recorded on a memory card 50 under the control of a memory card controller 49.

The digital camera 1 according to this embodiment is provided also with a camera-shake sensor 51. Angular velocity due to shaking of the digital camera 1 is detected by the camera-shake sensor 51. The digital camera 1 is further provided with a movement-amount calculation circuit 52 for calculating amount of movement of a subject. The movement-amount calculation circuit 52 detects the same image portion from within two consecutive frames of the image of a subject (although the frames need not be consecutive) as by image recognition processing, and calculates the amount of movement of this image portion. The traveling speed of the subject can be ascertained from the calculated amount of movement of the subject.

The image data that has been output from the signal processing circuit 44 as described above is applied to a digital/analog conversion circuit 45. The image data is restored to an analog video signal in the digital/analog conversion circuit 45 and the analog video signal is applied to an image shifting circuit 35.

When the focusing ring 32 provided on the periphery of the lens barrel 2 as described above is rotated, the amount of rotation of the focusing ring 32 is detected by an encoder 33. A signal indicating the amount of rotation detected is input to a distance calculation circuit 34. Based upon the entered signal indicating amount of rotation, the distance calculation circuit 34 calculates a distance (in-focus distance) indicating at what distance in front of the camera a subject at this distance comes into focus (this represents manual focusing). Data indicating the distance calculated is input to the image shifting circuit 35.

As mentioned above, the video signal indicating the image of the subject also is being input to the image shifting circuit 35. As will be described later in greater detail, processing by which the image of the subject is shifted in accordance with the calculated distance is executed in the image shifting circuit 35. The video signal that is output from the image shifting circuit 35 is applied to an electronic viewfinder 65 of the finder unit 60 by an LCD driver 36. The electronic viewfinder 65 is a liquid crystal display device. Thus it becomes possible to display the image of the subject, which has been obtained by imaging, on the display screen of the electronic viewfinder 65.

The finder unit 60 is equipped with an eyepiece lens 66 provided in front of the eyepiece window 11. A prism 63 formed to have a half-mirror 64 is provided in front of the eyepiece lens 66. The half-mirror 64 is formed so as to have a 45-degree angle of incidence with respect to optical axis C3 of the optical viewfinder 60. An OVF (optical viewfinder) shutter (which may be a mechanical shutter or a liquid crystal shutter) 62 and an objective lens 61 are provided in front of the prism 63.

When the OVF shutter 62 is open, the image of a subject OB formed by the objective lens 61 and the eyepiece lens 66 can be seen through the eyepiece window 11. Further, when the image of the subject obtained by imaging is displayed on the display screen of the electronic viewfinder 65 when the OVF shutter 62 is open, light rays representing the image of the subject are reflected by the half-mirror 64 so that the user can see the image of the subject being displayed on the display screen of the electronic viewfinder 65. The image of the subject displayed on the display screen of the electronic viewfinder 65 can be seen superimposed upon the optical image of the subject formed by the objective lens 61, etc.

Let C2 represent the optical axis of the lens barrel 2 (the optical axis of the lens barrel 2 and the optical axis of the solid-state electronic image sensing device 41 are the same) and let C3 represent the optical axis of the finder unit 60. The optical axes C2 and C3 do not coincide. As a consequence, parallax having a parallax angle θ is produced between the subject OB when viewed through the finder unit 60 and the subject OB imaged utilizing the lens barrel 2. In a case where the image of the subject displayed on the display screen of the electronic viewfinder 65 is viewed superimposed upon the optical image of the subject seen through the finder unit 60, as described above, the optical image of the subject seen through the finder unit 60 and the image of the subject displayed on the electronic viewfinder 65 are offset from each other due to parallax despite the fact that the user is viewing the same subject OB. In this embodiment, the image of the subject is shifted in the image shifting circuit 35 so as to correct for parallax. In a case where the focusing lens group 31 has been positioned by the focusing ring 32 so as to bring the subject OB into focus, the optical image of the subject seen through the eyepiece window 11 of the finder unit 60 and the image of the subject displayed in the electronic viewfinder 65 will coincide. If the subject OB is not in focus, the optical image of the subject seen through the eyepiece window 11 of the finder unit 60 and the image of the subject displayed in the electronic viewfinder 65 will not coincide. Thus a so-called image coincidence finder unit can be realized with the digital camera 1 according to this embodiment.

Figure 5:
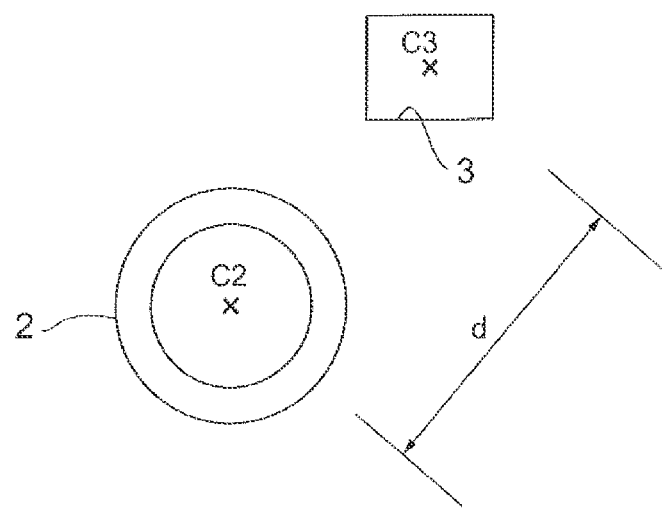
FIG. 5 illustrates offset between the optical axis of a lens barrel and the optical axis of a finder unit.

FIG. 5 illustrates the relationship between the lens barrel 2 and the objective window 3 when the digital camera 1 is viewed from the front.

The optical axis C2 of the lens barrel 2 and the optical axis C3 of the optical finder 60 (objective window 3) are a distance d apart and parallax exists between them. Consequently, in a case where a subject does not exist at a position regarded as infinity, an offset develops between the image of the subject seen through the eyepiece window 3 and the image of the subject captured by the lens barrel 2. As described above, when the image of a subject captured by the solid-state electronic image sensing device 34 is displayed in the electronic viewfinder 65 and this is superimposed upon the optical image of the subject formed via the objective window 3, there are instances where, owing to the aforesaid parallax, the portion of the image of the subject displayed in the electronic viewfinder 65 and the optical image of the subject will not coincide even if the focusing lens group 31 has been positioned so as to bring the subject into focus.

Figure 6:
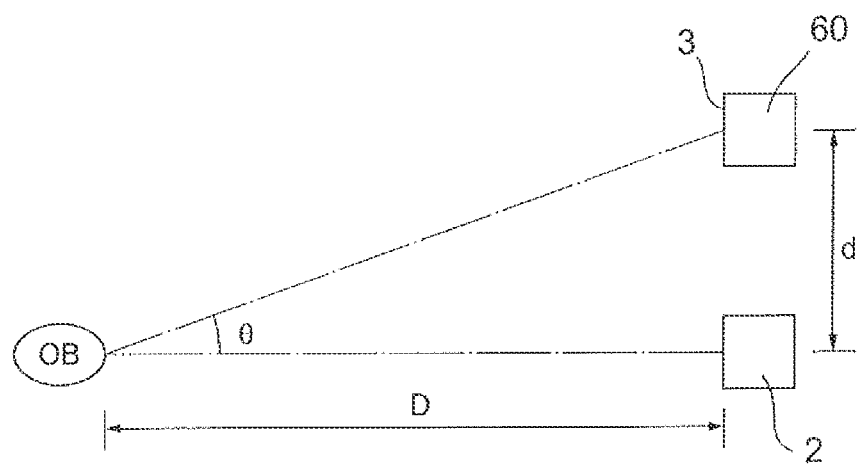
FIG. 6 illustrates parallax between the lens barrel and the finder unit.

FIG. 6 illustrates a case where the subject OB is seen (imaged) via the lens barrel 2 and how the subject OB is seen through the eyepiece window 3 of the finder unit 60.

As mentioned above, the distance between the optical axis C2 of the lens barrel 2 and the optical axis C3 of the eyepiece window 3 is d. Let D represent the distance from the lens barrel 2 to the subject OB. Accordingly, a parallax angle θ defined by a line from the lens barrel 2 to the object OB and a line from the eyepiece window 3 to the object OB is θ=arctan(d/D). That is, in a case where the subject OB is viewed through the lens barrel 2, the subject OB that appears in front is seen offset by the parallax angle θ from the eyepiece window 3 (finder unit 60). [The subject OB is offset from the lens barrel 2 (solid-state electronic image sensing device 41) by the parallax angle θ also in a case where the subject OB is viewed through the eyepiece window 3).]

Figure 7:
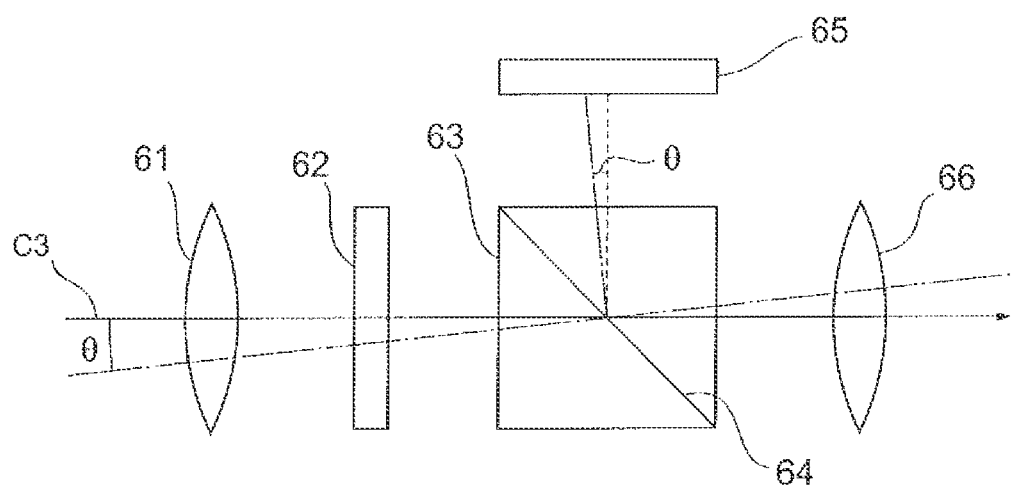
FIG. 7 is a plane view of the finder unit and a perspective view of the finder unit.
Figure 7:
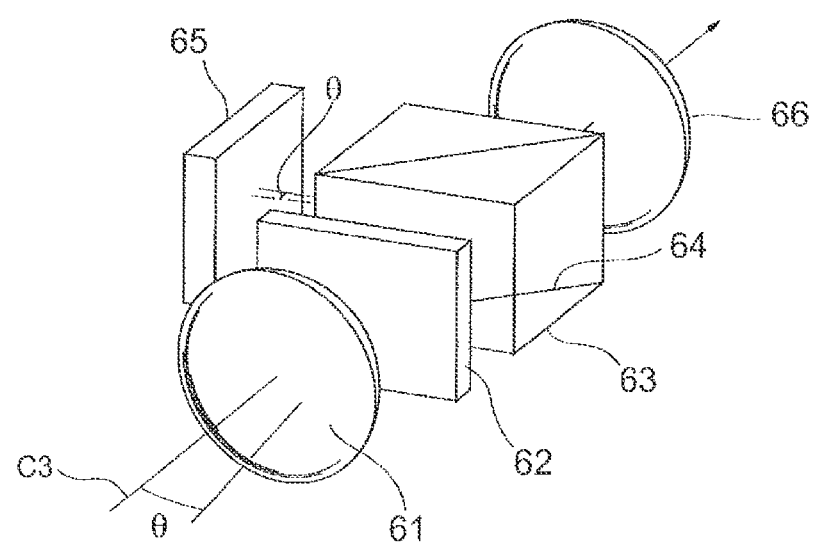

FIG. 7 illustrates the structure of the finder unit 60. The diagram at the top of FIG. 7 illustrates the finder unit 60 in a planar view in a manner similar to FIG. 4, and the diagram at the bottom of FIG. 7 illustrates the finder unit 60 in three dimensions. Components in FIG. 7 identical with those shown in FIG. 4 are designated by like reference characters.

As shown in FIGS. 4 and 6, when the subject OB is viewed through the eyepiece window 3, it is offset from the optical axis of the optical viewfinder 60 by the parallax angle θ. (In a case where the camera angle is decided by looking through the eyepiece window 3, it is conceivable that the subject OB will reside on the optical axis C3 of the finder unit 60. Even in such case, however, the subject. OB will be offset by the parallax angle θ from the optical axis C2 of the lens barrel 2.) Therefore, in order to make the portion of the image of the subject displayed in the electronic viewfinder 65 coincide with the optical image of the subject formed through the eyepiece window 3, the portion of the image of the subject need only be displayed upon being shifted by the parallax angle θ. It goes without saying that the direction in which the portion of the image of the subject is shifted through the above-mentioned angle is decided in accordance with the positional relationship between the positions where the eyepiece window 3 and lens barrel 2 are placed and the position where the finder unit 60 is placed.

Figure 8:
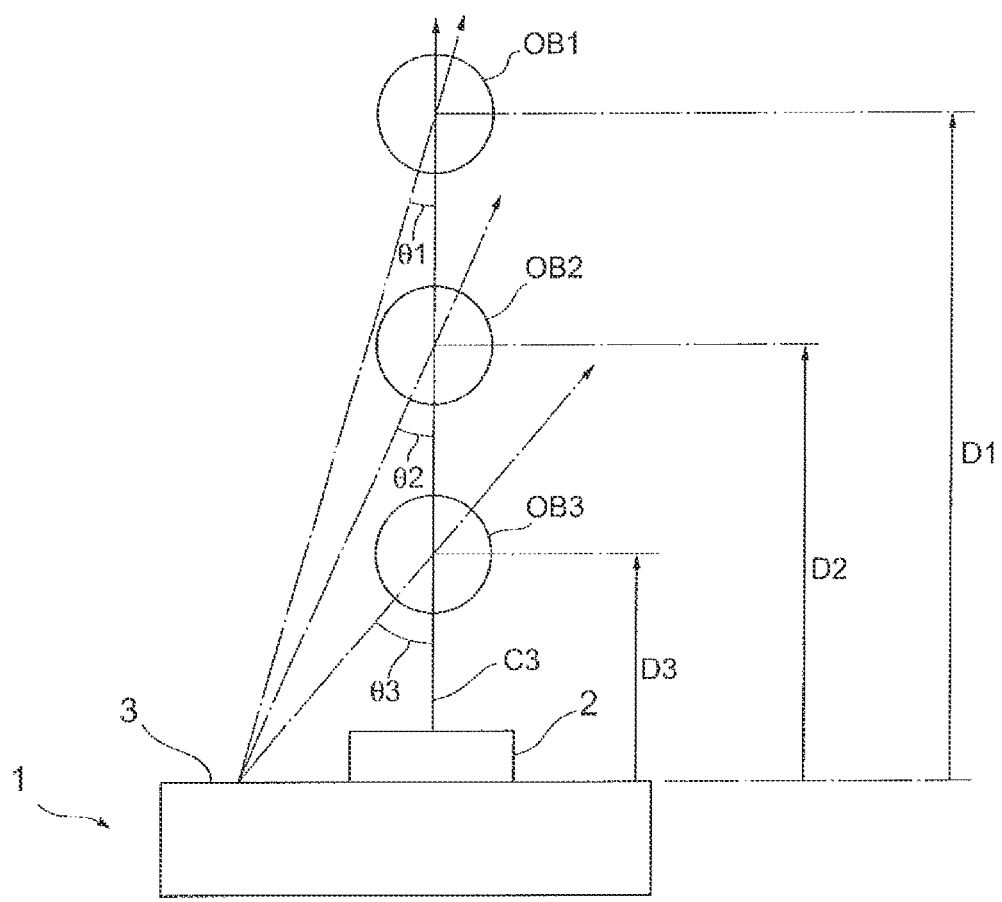
FIG. 8 illustrates the relationship between distance from a digital camera to a subject and parallax angle.

FIG. 8 illustrates the positional relationship among the digital camera 1 and principal subjects OB1, OB2 and OB3 when viewed in a plane.

If the principal subject OB1 is at a position (having a distance D1) comparatively far from the digital camera 1, then a parallax angle formed with the optical axis of the eyepiece window 3 will be θ1 in a case where the principal subject OB1 is viewed from the eyepiece window 3. Similarly, if the principal subject. OB2 is at an intermediate position (having a distance D2) that is neither far from nor close to the digital camera 1, then a parallax angle formed with the optical axis of the eyepiece window 3 will be θ2 in a case where the principal subject OB2 is viewed from the eyepiece window 3. Furthermore, if the principal subject. OB3 is at a position (having a distance D3) close to the digital camera 1, then a parallax angle formed with the optical axis of the eyepiece window 3 will be θ3. These parallax angles θ1, θ2 and θ3 are related as follows: θ1<θ2<θ3. In a case where the subject is located at a position so far away that it can be regarded as being at infinity, the parallax angle is almost negligible. In such case there will be almost no offset between the optical image of the subject seen through the eyepiece window 3 and the image of the subject displayed in the electronic viewfinder 65. This means that the above-mentioned parallax correction need not necessarily be applied in a case where the user views a subject at a great distance from the digital camera 1.

Figure 9:
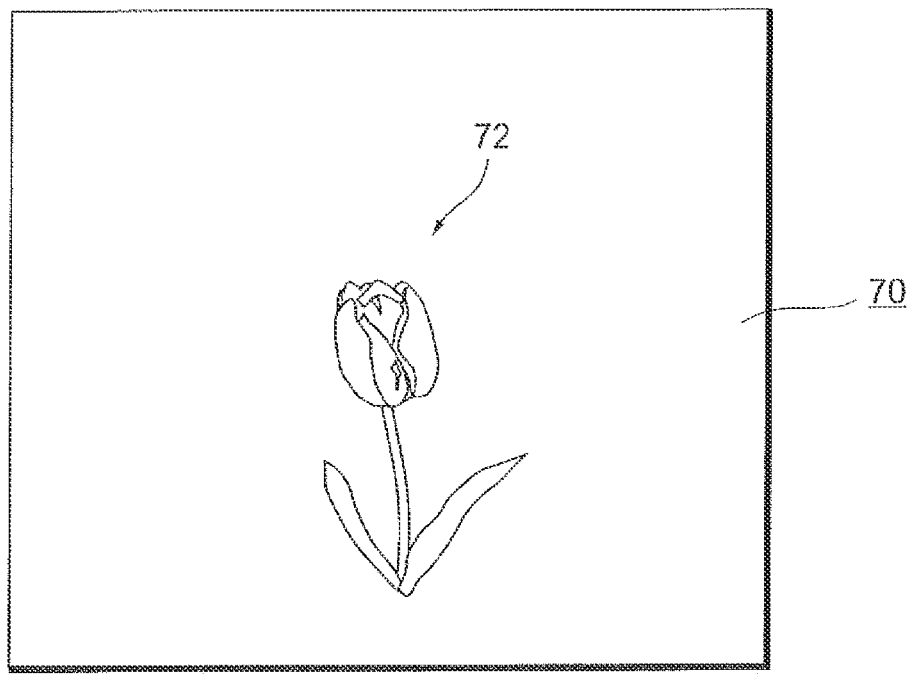
FIG. 9 is an example of the optical image of a subject.

FIG. 9 is an example of the optical image 70 of the subject seen through the objective window 3 of the finder unit 60.

An image 72 of a principal subject, which is to be brought into focus, is positioned at the approximate center of the image 70 of the subject.

Figure 10:
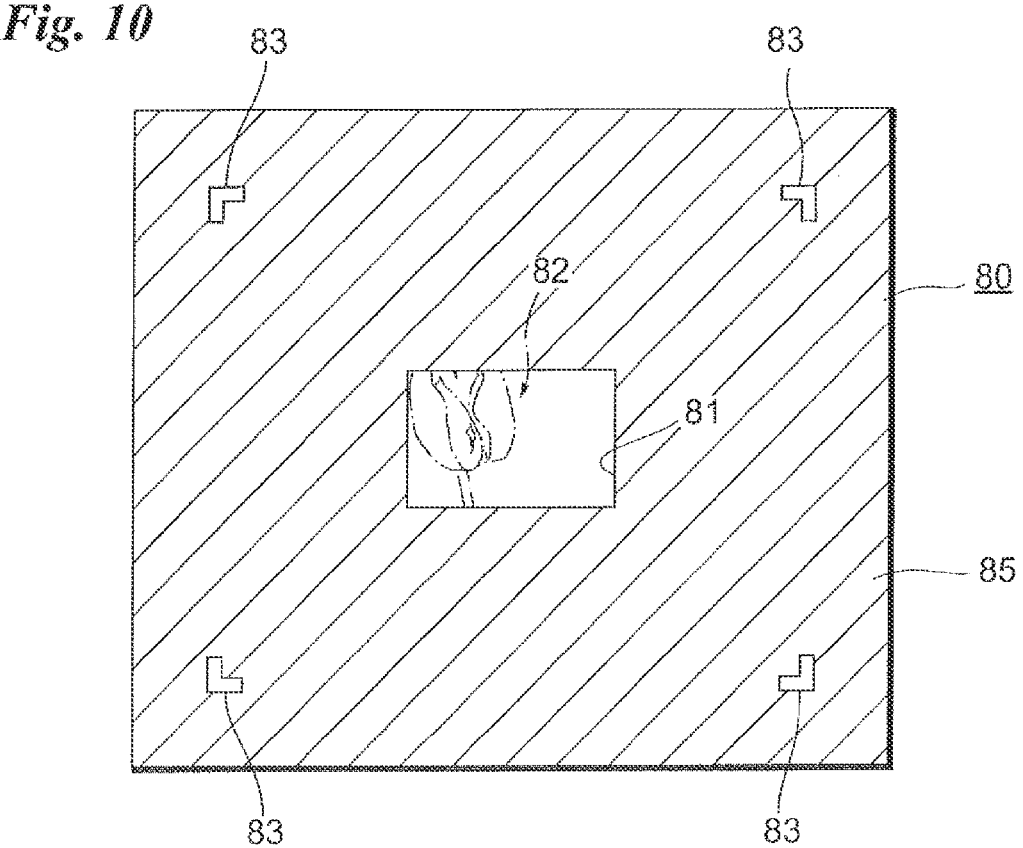
FIG. 10 is an example of an electronic viewfinder image displayed in an electronic viewfinder.

FIG. 10 is an example of an electronic viewfinder image 80 displayed on the display screen of the electronic viewfinder 65.

One AF target area 81 has been formed at the approximate center of the electronic viewfinder image 80. An image 82 of the subject captured by the solid-state electronic image sensing device 41 is being displayed in the AF target area 81. (The image 82 is illustrated by chain lines in FIG. 10 so as to indicate that this image has been obtained by electronic imaging.) The image of the subject 82 being displayed at the AF target area 81 was shifted by the image shift circuit 35 as mentioned above. The region surrounding the AF target area 81 is a mask region 85. In the image of the subject captured by the solid-state electronic image sensing device 41, the mask region 85 masks the image that is not being displayed in the AF target area 81. Further, brackets of a visual-field frame 83 indicating a picture-taking zone are being displayed at the four corners of the electronic viewfinder image 80. Data indicating the mask region 85 and visual-field frame 83 has been stored in the memory 46. These items of data are read out of the memory 46 and applied to the LCD driver 36 by the CPU 47, whereby the mask region 85 and visual-field frame 83 are displayed.

Figure 11:
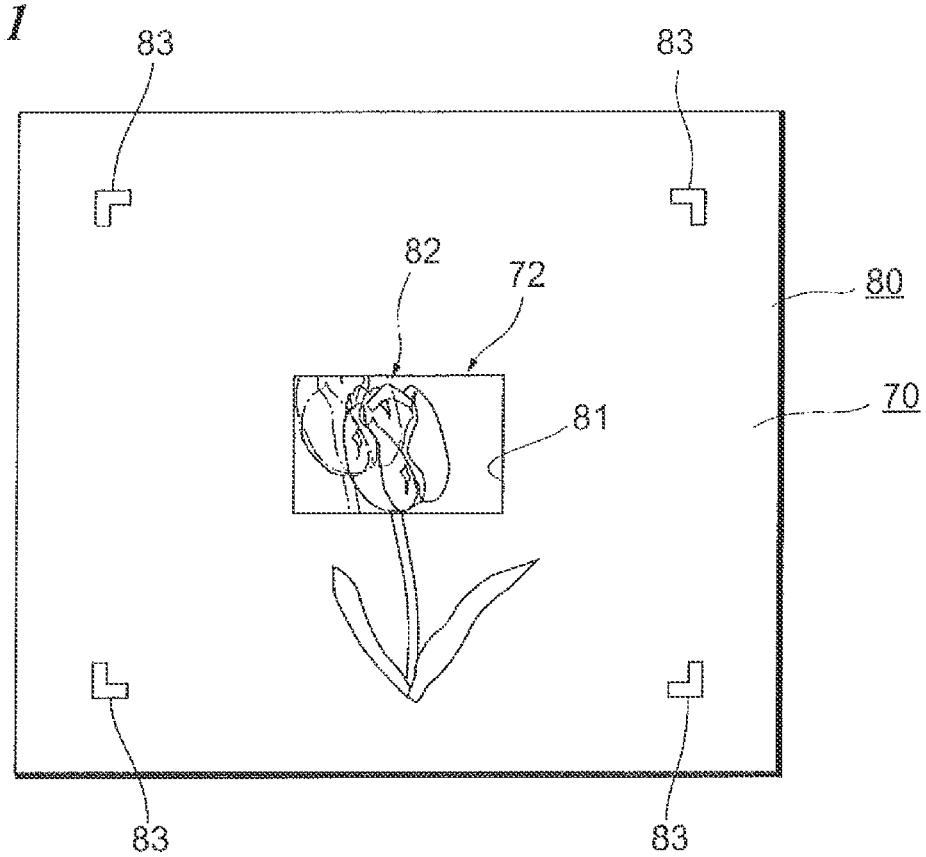
FIG. 11 illustrates an optical image of a subject and an electronic viewfinder image in superimposed form.

FIG. 11 is an example of a finder image seen through the eyepiece window 11.

When the OVF shutter 62 is open and the electronic viewfinder image 80 is being displayed in the electronic viewfinder 65, an image obtained by superimposing the electronic viewfinder image 80, which is shown in FIG. 10, upon the optical image 70 of the subject shown in FIG. 9 can be seen through the eyepiece window 11.

Although parallax develops between the optical axis C2 of the lens barrel 2 and the optical axis C3 of the finder unit 60 as mentioned above, the position at which the electronic viewfinder 65 is displayed is shifted by the image shifting circuit 35 in such a manner that a parallax correction is applied to the image 82 of the subject displayed in the electronic viewfinder 65. As a result, if the image 82 of the subject within the AF target area 81 is in focus, then the image 82 of the subject that is being superimposed upon the optical image 72 of the subject will coincide with it. If the image 82 of the subject within the AF target area 81 is not in focus, then an offset will develop between the optical image 72 of the subject and the image 82 of the subject that is being superimposed upon it. Focusing by way of manual focusing can be achieved by rotating the focusing ring 32 in accordance with the offset between the optical image 72 of the subject and the electronically captured image 82 of the subject.

Figure 12:
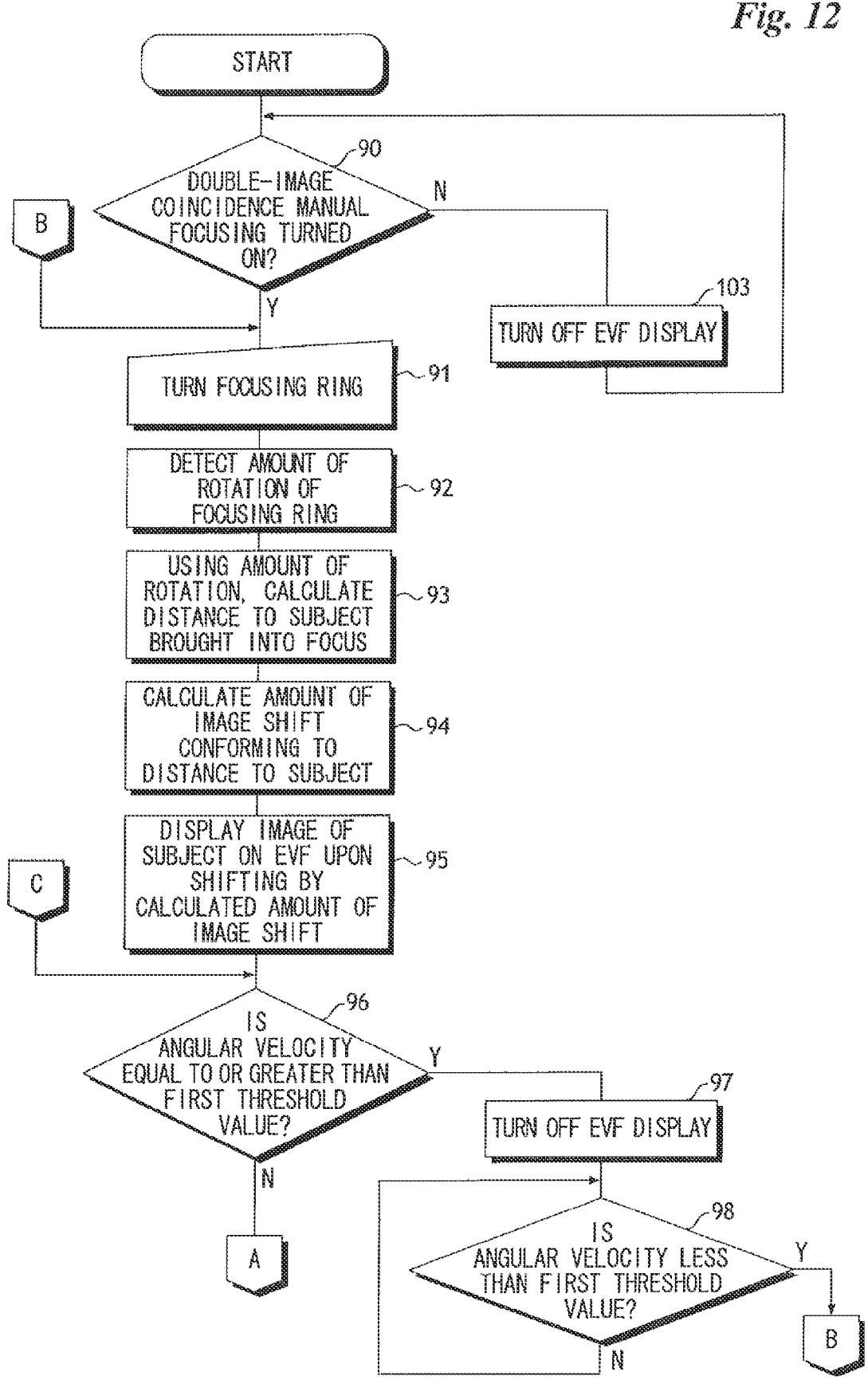
FIGS. 12 and 13 are flowcharts illustrating processing executed by the digital camera.

FIG. 12 is a flowchart illustrating focusing processing.

It is determined whether the camera has been set to the double-image coincidence manual focusing mode by the focus setting lever 20 as described above (step 90 in FIG. 12). If autofocus has been set and not the double-image coincidence manual focusing mode ("NO" at step 90 in FIG. 12), the display of the electronic viewfinder 65 is turned off (step 103 in FIG. 12). Since the electronic viewfinder 65 is turned off, the user would shoot while viewing the image of the subject being displayed on the liquid crystal display screen 12 formed on the back of the digital camera 1. Naturally, it may be arranged so as to close the OVF shutter 62 and display the image of the subject in the electronic viewfinder 65 if autofocus has been set. The user can shoot while looking at image of the subject, which is displayed in the electronic viewfinder 65, through the eyepiece window 11.

If double-image coincidence manual focusing has been set by the focus setting lever 20 ("YES" at step 90 in FIG. 12), the OVF shutter 62 opens. The optical image of the subject can be seen through the finder unit 60.

The user looks through the eyepiece window 11 of the finder unit 60 and turns the focusing ring 32 while viewing the optical image of the subject (step 91 in FIG. 12). The amount of rotation of the focusing ring 32 is detected by the encoder 33 (step 92 in FIG. 12) and the distance from the digital camera 1 to the subject brought into focus by the focusing lens group 31 is calculated (step 93 in FIG. 12). The relationship between the amount of rotation of the focusing ring 32 and the distance from the digital camera 1 to the subject brought into focus by the focusing lens group 31 is detected beforehand at the manufacturing stage of the digital camera 1. Data indicating this relationship is stored in a memory (not shown) within the distance calculation circuit 34. By utilizing the data indicating this relationship, and based upon the amount of rotation of the focusing lens group 31, the distance calculation circuit 34 calculates the distance from the digital camera 1 to the subject brought into focus by the focusing lens group 31.

The amount of image shift for effecting the parallax correction is calculated in accordance with the calculated distance (step 94 in FIG. 12). It goes without saying that, with regard to the relationship between the amount of shift and the distance from the digital camera 1 to the subject brought into focus by the focusing lens group 31, the relationship is calculated beforehand and stored at the manufacturing stage of the digital camera.

The image of the subject captured by the solid-state electronic image sensing device 41 is displayed on the display screen of the electronic viewfinder 65 upon being shifted by the amount of the image shift calculated in accordance with the amount of rotation of the focusing lens group 31 (step 95 in FIG. 12). As mentioned above, if the image 82 of the subject within the AF target area 81 is not in focus, an offset will develop relative to the optical image 72 of the subject.

If the image 82 of the subject within the AF target area 81 is in focus, then it will coincide with the optical image 72 of the subject. Thus, the finder unit 60 is of the so-called double-image coincidence type. For example, with reference to FIG. 8, assume that, even though a subject is the subject OB2 at the distance D2, the user has rotated the focusing ring 32 so as to bring into focus the subject OB1 at the distance D1 or the subject OB3 at the distance D3. In such case the user looking through the finder unit 60 will see a double image of the subject, namely two images with an offset between them. If the focusing ring 32 is rotated so as to bring into focus the subject OB2 at the distance D2, the user looking through the finder unit 60 will see an image of the subject that is devoid of image offset.

The digital camera 1 shakes and the angular velocity of the digital camera 1 is detected by the camera-shake sensor 51. If the angular velocity detected is equal to or greater than a first threshold value ("YES" at step 96), the captured image of the subject will appear blurry. Even if the subject is in focus, therefore, the image 82 of the subject within the AF target area 81 displayed in the electronic viewfinder 65 and the optical image 72 of the subject will not coincide. Consequently, the display on the display screen of the electronic viewfinder 65 is turned off (step 97 in FIG. 12). If the angular velocity is less than the first threshold value ("YES" at step 98 in FIG. 12), then processing from step 91 onward is repeated and the image 82 within the AF target area 81 is displayed on the display screen of the electronic viewfinder 65. When the display on the display screen of the electronic viewfinder 65 turns off in the case where the camera shakes and the angular velocity is equal to or greater than the first threshold value ("YES" at step 96 in FIG. 12), often the user would perform manual focusing while viewing the image of the subject displayed on the liquid crystal display screen 12 provided on the back of the camera. It is preferred, therefore, to adopt an arrangement in which, even if the angular velocity is equal to or greater than the first threshold value ("YES" at step 96 in FIG. 12), the OVF shutter 62 is turned off so that the image of the subject displayed in the electronic viewfinder 65 can be seen through the eyepiece window 11. In this case, not only would the image within the AF target area 81 be displayed in the electronic viewfinder 65, as illustrated in FIG. 10, but so would the entire captured image of the subject. Even in case of camera shake, the user, while looking through the eyepiece window 11, can continue manual focusing while viewing the image of the subject displayed on the display screen of the electronic viewfinder 65.

Figure 13:
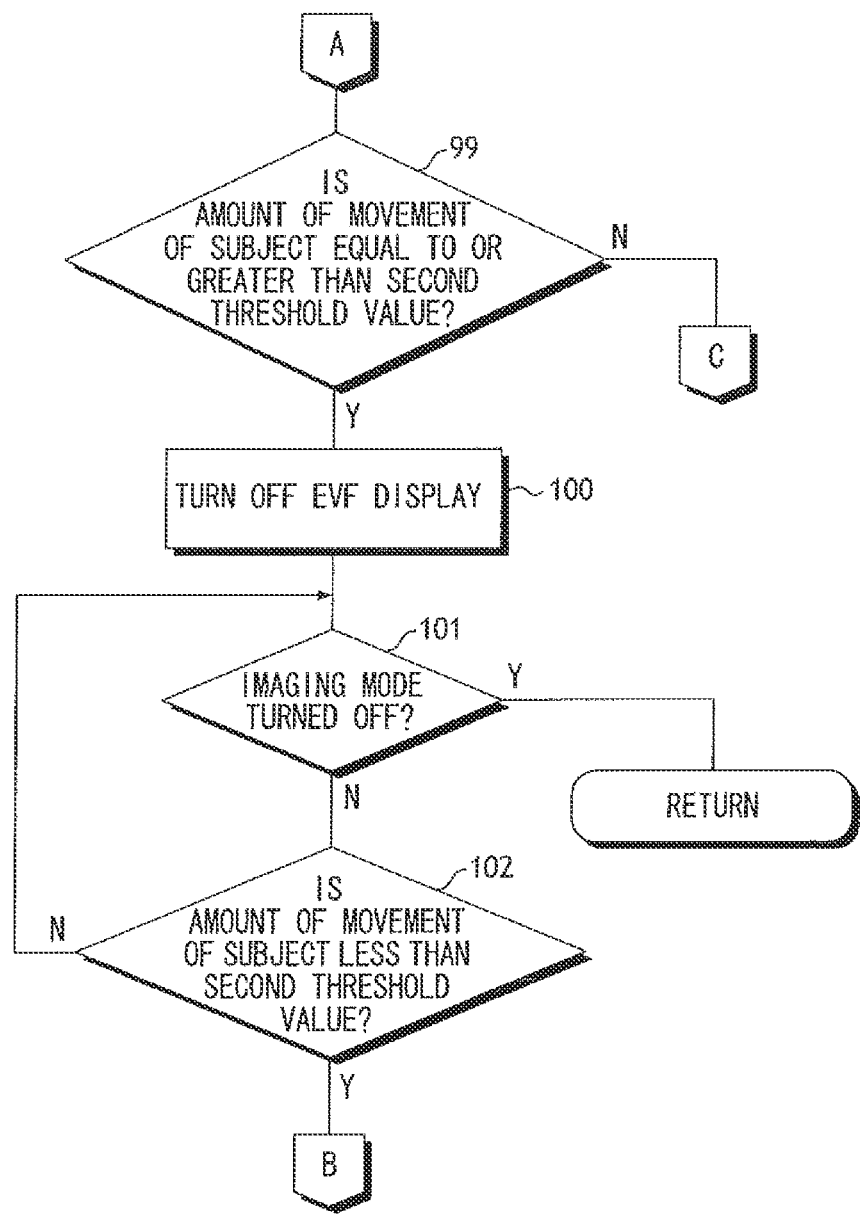

If the angular velocity detected is less than the first threshold value ("NO" at step 96 in FIG. 12), the camera is not shaking and therefore it is determined whether the amount of movement of the subject is equal to or greater than a second threshold value (step 99 in FIG. 13). The amount of movement of the subject is calculated by the movement-amount calculation circuit 52 as mentioned above. If a plurality of moving subjects exist in the captured image of the subject, the amount of movement of the subject exhibiting the most motion may be calculated, or the amount of movement of the subject that was within the AF target area 81 may be calculated. If the calculated amount of movement of the subject is less than the second threshold value ("NO" at step 99), this means that the camera is not shaking and that a fast-moving subject does not exist. Accordingly, the subject is brought into focus by double-image coincidence manual focusing.

If the amount of movement of the subject is equal to or greater than the second threshold value ("YES" at step 99 in FIG. 13), then the subject is moving at high speed. This means that manual focusing based upon double-image coincidence is not appropriate. The display on the display screen of the electronic viewfinder 65, therefore, is turned off. The user would execute manual focusing processing while viewing the image of the subject displayed on the display screen 12 of the liquid crystal display device. Of course, in a manner similar to that described above, it may be arranged so that the OVF shutter 62 is turned off and the entire captured image of the subject displayed on the display screen of the electronic viewfinder 65. The user can achieve manual focusing while looking at the entire image of the subject, which is displayed on the display screen of the electronic viewfinder 65, through the eyepiece window 11. If the amount of movement of the subject is less than the second threshold value, the processing of steps 96 and 98 is repeated. However, processing from step 91 onward may be repeated.

If the imaging mode is not turned off ("NO" at step 101 in FIG. 13) and, moreover the amount of movement of the subject is less than the second threshold value ("YES" at step 102 in FIG. 13), then processing from step 91 onward is repeated.

In the foregoing embodiment, the arrangement is such that, even if, when the angular velocity or amount of movement of the subject is equal to or greater than the threshold value, the camera has been set to the double-image coincidence manual focusing mode, the display on the display screen of the electronic viewfinder 65 is turned off or the OVF shutter 62 is closed and the entire captured image of the subject is displayed in the electronic viewfinder 65. However, it may be arranged to cancel the manual focusing mode itself and activate autofocus. In a case where autofocus is activated, the OVF shutter 62 may be opened, the display on the display screen of the electronic viewfinder 65 turned off and the camera angle decided while looking at the optical image of the subject through the eyepiece window 11, or the OVF shutter 62 may be closed, the captured image of the subject displayed in the electronic viewfinder 65 and the camera angle decided while viewing the image of the subject, which is displayed in the electronic viewfinder 65, through the eyepiece window 11. It goes without saying that the camera angle may be decided not while looking through the eyepiece window 11 but while viewing the image of the subject displayed on the display screen of the liquid crystal display device 12.

By pressing the shutter-release button when the desired subject has been brought into focus, image data representing the captured image of the subject is recorded on the memory card 50.

Figure 14:
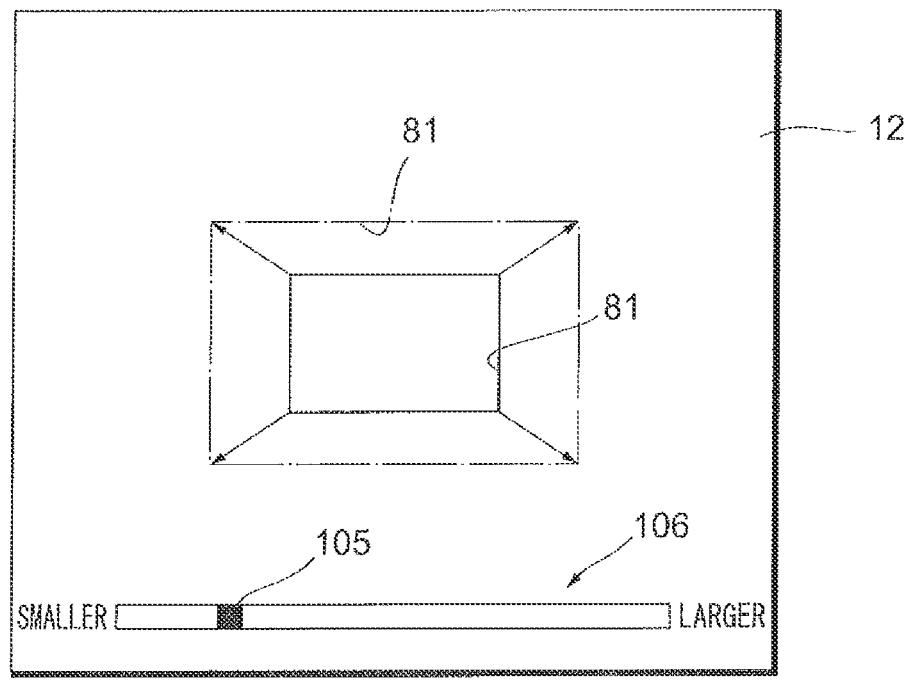
FIG. 14 is an example of an image for setting the frame of an AF target area.

FIG. 14, which illustrates a modification, is an example of an image for setting the size of the AF target frame.

If a menu display screen is selected utilizing the menu/OK button 15 among the buttons of the digital camera 1, it becomes possible to select a menu for setting the size of the AK target frame. When the menu for setting the size of the AF target frame is selected, an image for setting the size of the AF target frame shown in FIG. 14 is displayed on the liquid crystal display screen 12.

A size setting bar 106 extending in the transverse direction is formed below the image for setting the size of the AF target frame. A slider 105 freely slidable in the transverse direction along the size setting bar 106 also is formed. When the menu for setting the size of the AF target frame is selected, the user moves the slider 105 left or right along the size setting bar 106 by operating a prescribed button among the buttons of the digital camera 1. The size of the AF target area 81 decreases as the slider 105 is moved left and, as indicated by the chain lines, increases as the slider 105 is moved right. The AF target area 81 can thus be set to a desired size.

Figure 15:
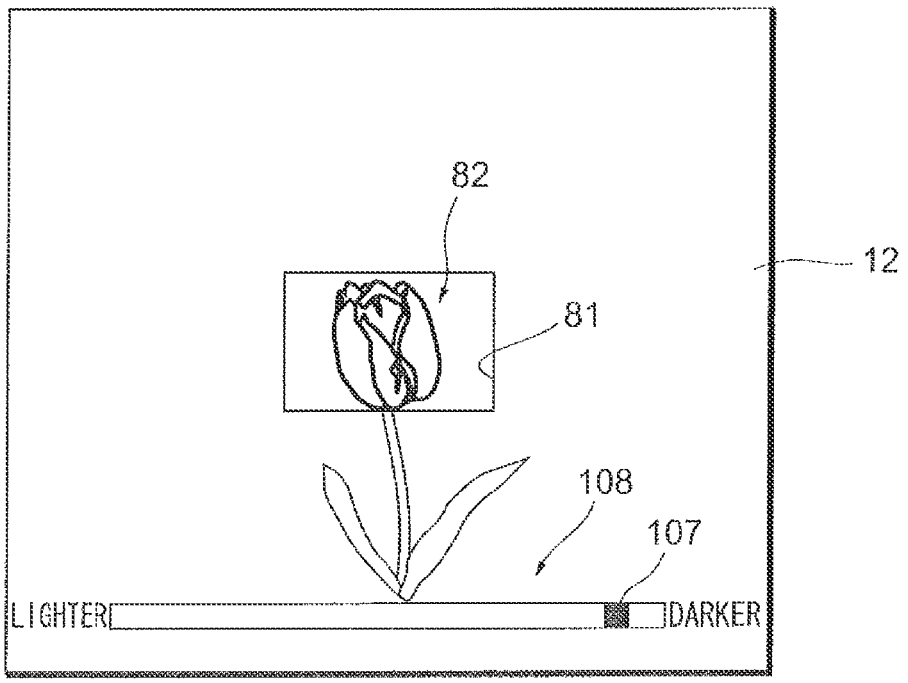
FIG. 15 is an example of an image for setting the density of an AF target area.

FIG. 15, which illustrates a further modification, is an image for setting the density of the AF target.

If the menu display screen is selected utilizing the menu/OK button 15 among the buttons of the digital camera 1, in a manner similar to the setting of the AF target frame described above, it becomes possible to select a menu for setting the density of the AF target frame. When the menu for setting the density of the AF target frame is selected, an image for setting the density of the AF target frame shown in FIG. 15 is displayed on the liquid crystal display screen 12.

A density setting bar 108 extending in the transverse direction is formed below the image for setting the density of the AF target frame. A slider 107 freely slidable in the transverse direction along the density setting bar 108 also is formed. When the menu for setting the density of the AF target frame is selected, the user moves the slider 107 left or right along the density setting bar 108 by operating a prescribed button among the buttons of the digital camera 1. The image 82 of the subject displayed within the AF target area 81 becomes fainter as the slider 107 is moved left and becomes darker as the slider 107 is moved right. The density of the image of the subject displayed within the AF target area 81 can thus be set.

Figure 16:
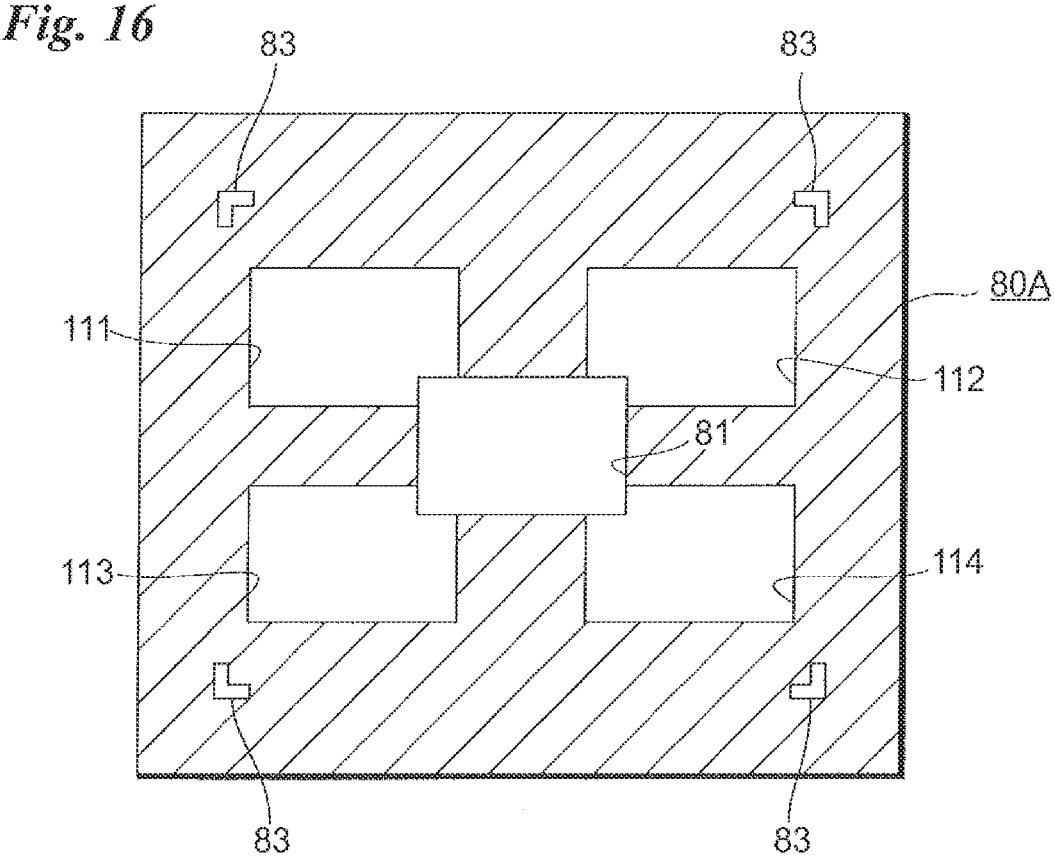
FIG. 16 is an example of an electronic viewfinder image.

FIG. 16, which illustrates yet another modification, is an example of an electronic viewfinder image 80A displayed on the display screen of the electronic viewfinder 65. This corresponds to the electronic viewfinder image 80 shown in FIG. 10.

In the example shown in FIG. 10, the single AF target area 81 is set approximately at the center. In the example shown in FIG. 15, however, the signal AF target area 81 is set approximately at the center but, in addition, four AF target areas 111 to 114 are set around the AF target area 81.

By thus setting the plurality of AF target areas 81 and 111 to 114, a subject within the desired target frame can be brought into focus.

In a case where the plurality of AF target areas 81 and 111 to 114 are set, the menu display screen is set and the menu for setting the AF target area is selected in a manner similar to that described above. When this done, the number of AF targets to be set can be entered and so can the positions at which the AF target areas are to be set. If necessary, the display screen 12 may be provided with a touch-sensitive panel or the like and the positions of the AF target areas may be specified on the touch-sensitive panel. Naturally, it may be arranged beforehand so that either the five AF target areas 81 and 111 to 114 can be set as shown in FIG. 16 or the single AF target area 81 as shown in FIG. 10, and so that the user may make either selection. It goes without saying that the corresponding image portions from within the image of the subject captured by the solid-state electronic image sensing device 41 would be displayed within these multiple AF target areas 81 and 111 to 114.

Figure 17:
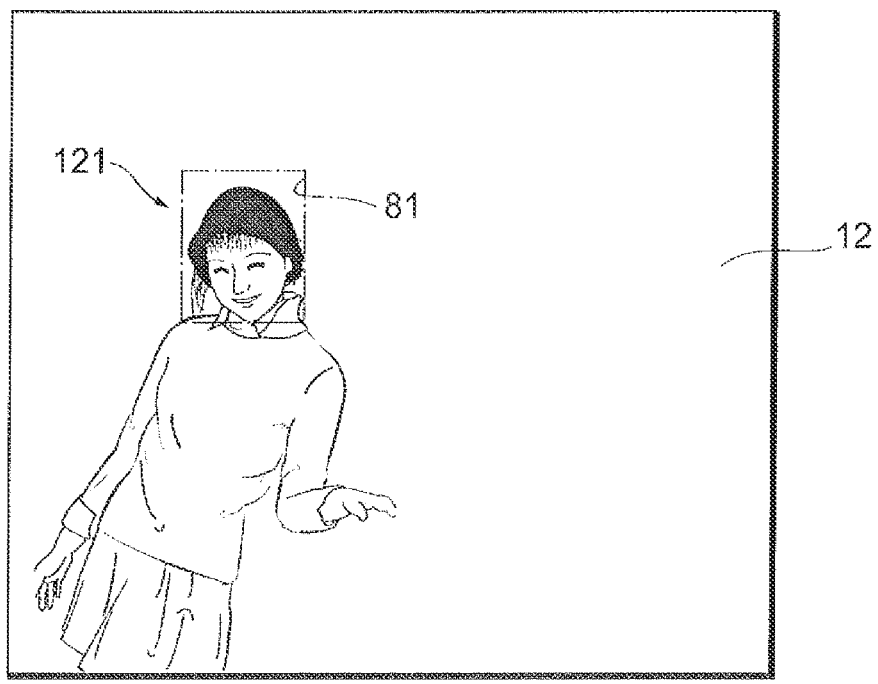
FIG. 17 is an example of the image of a subject in which a face has been detected.

FIG. 17, which illustrates yet another modification, is an example of the captured image of a subject.

A face image 121 is detected by imaging a subject. The area of the detected face image 121 is set in the AF target area 81. It will suffice if face detection is executed by the CPU 47. The face portion of the image will be brought into focus.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
   a lens barrel, which is provided on its periphery with a focusing ring being freely rotatable and incorporates a focusing lens, for adjusting the position of the focusing lens in accordance with rotation of the focusing ring;
   a solid-state electronic image sensing device for capturing the image of a subject, which is formed by the focusing lens, and outputting image data representing the image of the subject;
   a liquid crystal device, which is provided on the back of the camera, for displaying the image of the subject represented by the image data that has been output from said solid-state electronic image sensing device;
   an electronic viewfinder for displaying on a display screen an image within a desired AF target area in the image of the subject represented by the image data that has been output from said solid-state electronic image sensing device;
   a finder unit formed on the front of the camera and having an objective window facing a subject and an eyepiece window for looking at an optical image of the subject seen through the objective window via an optical viewfinder shutter;
   a deflecting unit, which is provided between the objective window and the eyepiece window, for introducing the image within the AF target area, which is being displayed on the display screen of the electronic viewfinder, to the eyepiece window;
   a display control device for controlling said electronic viewfinder so as to display the image within the AF target area on the display screen in such a manner that, if the image within the AF target area is out of focus, the optical image of the subject seen through the objective window and the image within the AF target area will be offset from each other, and so as to display the image within the AF target area on the display screen in such a manner that, if the image within the AF target area is in focus, the optical image of the subject seen through the objective window and the image within the AF target area will coincide;
   a motion determination device for determining whether the camera or the subject is moving an amount equal to or greater than a threshold value; and
   a shutter control device, responsive to a determination by said motion determination device that the camera or the subject is moving an amount equal to or greater than the threshold value, for closing the optical viewfinder shutter.

2. The camera according to claim 1, wherein said display control device includes a rotation-amount detection device for detecting amount of rotation of the focusing ring;
   said display control device controlling said electronic viewfinder, based upon amount of rotation detected by said rotation-amount detection unit, so as to display the image within the AF target area on the display screen in such a manner that, if the image within the AF target area is out of focus, the optical image of the subject seen through the objective window and the image within the AF target area will be offset from each other in at least the transverse direction, and so as to display the image within the AF target area on the display screen in such a manner that, if the image within the AF target area is in focus, the optical image of the subject seen through the objective window and the image within the AF target area will coincide.

3. The camera according to claim 2, wherein said display control device controls said electronic viewfinder, based upon amount of rotation detected by said rotation-amount detection device, so as to display the image within the AF target area on the display screen in such a manner that, if the image within the AF target area is out of focus, the optical image of the subject seen through the objective window and the image within the AF target area will be offset from each other on an axis connecting optical axis of said lens barrel and optical axis of said finder unit, and so as to display the image within the AF target area on the display screen in such a manner that, if the image within the AF target area is in focus, the optical image of the subject seen through the objective window and the image within the AF target area will coincide.

4. The camera according to claim 1, wherein said display control device controls said electronic viewfinder so as to cause the image within the AF target area to move along at least the transverse direction in accordance with rotation of the focusing ring, and so as to display the image within the AF target area on the display screen in such a manner that, in a case where in-focus position of the focusing lens coincides with distance to the subject, the optical image of the subject seen through the objective window and the image within the AF target area will coincide.

5. The camera according to claim 1, wherein said display control device further includes:
a distance calculation device for calculating, based upon the amount of rotation detected by said rotation-amount detection device, at what distance in front of the camera a subject at this distance is in focus;
said display control device causing the optical image of a subject seen through the objective window of said finder unit, where this subject is at the distance calculated by said distance calculation device, to coincide with the image within the AF target area being displayed on the display screen of said electronic viewfinder owing to imaging of this subject by said solid-state electronic image sensing device.

6. The camera according to claim 1, wherein said display control device displays the image within the AF target area on the display screen upon correcting an offset between the optical image of the subject seen through the objective window and the image within the AF target area, the offset being ascribable to an offset between optical axis of said solid-state electronic image sensing device and optical axis of said finder unit.

7. The camera according to claim 6, wherein said display control device displays the image within the AF target area on the display screen upon correcting, by a correction quantity that conforms to the distance calculated by said distance calculation device, an offset between the optical image of the subject seen through the objective window and the image within the AF target area, the offset being ascribable to an offset between optical axis of said solid-state electronic image sensing device and optical axis of said finder unit.

8. The camera according to claim 1, further comprising a first AF target area setting device for setting at least one among position, size and number of the AF target area(s).

9. The camera according to claim 1, further comprising a second AF target area setting device for setting at least one of brightness and density of the image within the AF target area.

10. The camera according to claim 1, further comprising:
a face detection device for detecting the area of a face included in the image of a subject captured by said solid-state electronic image sensing device; and
a third AF target area setting device for setting the area of the face, which has been detected by said face detection device, to the AF target area.

11. A method of controlling operation of a camera having a lens barrel, which is provided on its periphery with a focusing ring being freely rotatable and incorporates a focusing lens, for adjusting the position of the focusing lens in accordance with rotation of the focusing ring, and a finder unit formed on the front of the camera and having an objective window facing a subject and an eyepiece window for looking at an optical image of the subject seen through the objective window via an optical viewfinder shutter, said method comprising steps of:
a solid-state electronic image sensing device capturing the image of a subject, which is formed by the focusing lens, and outputting image data representing the image of the subject;
a liquid crystal device, which is provided on the back of the camera, displaying the image of the subject represented by the image data that has been output from the solid-state electronic image sensing device;
an electronic viewfinder displaying on a display screen an image within a desired AF target area in the image of the subject represented by the image data that has been output from the solid-state electronic image sensing device;
a deflecting unit, which is provided between the objective window and the eyepiece window, introducing the image within the AF target area, which is being displayed on the display screen of the electronic viewfinder, to the eyepiece window;
a display control device controlling the display unit so as to display the image within the AF target area on the display screen in such a manner that, if the image within the AF target area is out of focus, the optical image of the subject seen through the objective window and the image within the AF target area will be offset from each other, and so as to display the image within the AF target area on the display screen in such a manner that, if the image within the AF target area is in focus, the optical image of the subject seen through the objective window and the image within the AF target area will coincide;
a motion determination device determining whether the camera or the subject is moving an amount equal to or greater than a threshold value; and
in response to a determination by the motion determination device that the camera or the subject is moving an amount equal to or greater than a threshold value, a shutter control device closing the optical viewfinder shutter.

* * * * *